US009726485B2

(12) United States Patent
Hack

(10) Patent No.: US 9,726,485 B2
(45) Date of Patent: Aug. 8, 2017

(54) METHOD OF OBTAINING GEOGRAPHICALLY RELATED IMAGES USING A VEHICLE

(75) Inventor: Jeffrey Hack, London (CA)

(73) Assignee: iLOOKAbout Inc., London (CA)

(*) Notice: Subject to any disclaimer, the term of this patent is extended or adjusted under 35 U.S.C. 154(b) by 1035 days.

(21) Appl. No.: 12/596,553

(22) PCT Filed: Apr. 22, 2008

(86) PCT No.: PCT/CA2008/000745
§ 371 (c)(1),
(2), (4) Date: Oct. 19, 2009

(87) PCT Pub. No.: WO2008/128348
PCT Pub. Date: Oct. 30, 2008

(65) Prior Publication Data
US 2010/0141736 A1 Jun. 10, 2010

Related U.S. Application Data

(60) Provisional application No. 60/913,291, filed on Apr. 22, 2007.

(51) Int. Cl.
H04N 7/00 (2011.01)
H04N 7/18 (2006.01)
(Continued)

(52) U.S. Cl.
CPC .............. *G01C 11/00* (2013.01); *G01C 21/28* (2013.01); *G01C 21/3602* (2013.01); *G01C 22/02* (2013.01)

(58) Field of Classification Search
CPC .... G01C 11/00; G01C 21/3602; G01C 21/28; G01C 22/02
(Continued)

(56) References Cited

U.S. PATENT DOCUMENTS 5,058,023 A * 10/1991 Kozikaro .................. 701/494
5,517,419 A 5/1996 Lanckton et al.
(Continued)

FOREIGN PATENT DOCUMENTS

CA 2603329 A1 3/2008
EP 1746389 A1 * 1/2007
WO 2005/094550 A2 10/2005

OTHER PUBLICATIONS

Extended European Search Report dated Oct. 4, 2013 on corresponding European patent application 08748160.2.

*Primary Examiner* — Gims Philippe
*Assistant Examiner* — On S Mung
(74) *Attorney, Agent, or Firm* — Brunet & Co.; Robert Brunet

(57) ABSTRACT

The method employs a computer interconnected with a GPS transceiver and a distance measurement means and operatively interconnected with a digital camera, all provided on a moving vehicle, in order to acquire a plurality of geographic location related images. A first geographic position is obtained from the GPS transceiver and a plurality of distance measurements are then received before a second geographic position is taken. A photo request is generated after a pre-determined distance has been traveled and is transmitted to the digital camera. The camera takes a photo based on the request and the photos, photo requests, first and second positions and distance measurements are stored for post-processing. The post-processing determines a path traveled by the vehicle using the positions and distance measurements and assigns an accurate geographic location and orientation to each photo. The method is useful in building a database of geographically related images.

21 Claims, 4 Drawing Sheets

(51) Int. Cl.
*G01C 11/00* (2006.01)
*G01C 22/02* (2006.01)
*G01C 21/28* (2006.01)
*G01C 21/36* (2006.01)

(58) Field of Classification Search
USPC .................................................. 348/36, 148
See application file for complete search history.

(56) References Cited

U.S. PATENT DOCUMENTS

| | | | |
|---|---|---|---|
| 5,633,946 A | 5/1997 | Lachinski et al. | |
| 5,796,613 A | 8/1998 | Kato et al. | |
| 5,815,161 A * | 9/1998 | Emmerink et al. | 345/440 |
| 6,061,627 A | 5/2000 | Sato | |
| 6,233,523 B1 | 5/2001 | Sood | |
| 6,335,754 B1 | 1/2002 | Endo et al. | |
| 6,363,161 B2 | 3/2002 | Laumeyer et al. | |
| 6,571,052 B1 | 5/2003 | Wakimoto et al. | |
| 6,741,790 B1 | 5/2004 | Brugess | |
| 6,950,120 B1 | 9/2005 | Endo et al. | |
| 7,155,336 B2 | 12/2006 | Dorfman et al. | |
| 2002/0090143 A1* | 7/2002 | Endo et al. | 382/284 |
| 2002/0128770 A1* | 9/2002 | Ooishi | 701/207 |
| 2003/0139909 A1* | 7/2003 | Ozawa | 702/183 |
| 2003/0210806 A1* | 11/2003 | YoichiShintani et al. | 382/104 |
| 2005/0182518 A1 | 8/2005 | Karlsson | |
| 2005/0197767 A1* | 9/2005 | Nortrup | 701/209 |
| 2006/0004512 A1* | 1/2006 | Herbst et al. | 701/208 |
| 2006/0149455 A1* | 7/2006 | Sawada | 701/96 |
| 2006/0215020 A1* | 9/2006 | Mori et al. | 348/119 |
| 2006/0271287 A1 | 11/2006 | Gold et al. | |
| 2006/0276985 A1* | 12/2006 | Xu et al. | 702/81 |
| 2007/0057815 A1* | 3/2007 | Foy et al. | 340/905 |
| 2007/0069873 A1* | 3/2007 | Kudo | 340/435 |
| 2007/0136259 A1* | 6/2007 | Dorfman et al. | 707/3 |
| 2007/0188626 A1* | 8/2007 | Squilla et al. | 348/222.1 |
| 2007/0276589 A1* | 11/2007 | Inoue et al. | 701/206 |
| 2008/0189036 A1* | 8/2008 | Elgersma | 701/211 |
| 2010/0091020 A1* | 4/2010 | Kmiecik et al. | 345/427 |

* cited by examiner

METHOD OF OBTAINING GEOGRAPHICALLY RELATED IMAGES USING A VEHICLE

CROSS-REFERENCE TO RELATED APPLICATIONS

This application is a national entry under 35 U.S.C. 371 of PCT/CA2008/000745, filed Apr. 22, 2008, that claims the benefit of U.S. patent application 60/913,291, filed Apr. 22, 2007, which is incorporated herein by reference.

FIELD OF THE INVENTION

The present invention relates to a method of obtaining digital images related to geographic locations using a moving vehicle. In particular, the method relates to an automated method for acquiring a plurality of digital images into a computer and relating those images to a GPS position enhanced using a measurement of distance traveled by the vehicle between GPS co-ordinate fixes.

BACKGROUND

Geographically linked images provided as a database are useful in, for example, real estate marketing, municipal property tax assessment, utility company asset inventory collection, map-related visual cues for use in navigation or advertising, virtual tours of a neighborhood, etc. These images are desirably taken from a surface level perspective using a high resolution digital camera in order to create a digitally appealing result that can be displayed in a wide range of sizes and levels of image compression. Due to the large number of images being acquired in order to build a useful database, it is desirable to collect the images quickly using a moving vehicle, for example an automobile, boat, motorcycle, etc. To minimize the cost and time associated in building and updating the image database, it is desirable to employ teams of relatively unskilled workers using vehicles that are rented or leased for a short period of time in a particular location (e.g.: a particular city). Training time and vehicle modification are therefore to be avoided. The system should use commercially available components wherever possible, be portable, easy to repair and easy operate.

Previous attempts to automate image collection have employed video cameras. The audio track in the video recording is normally used to store position or time information in association with the images. The low quality image resolution provided by inexpensive video cameras limits the usefulness of the acquired images and it is desirable to avoid the cost and complexity of more expensive video cameras. Furthermore, it is difficult in practice to relate the location of a particular frame or series of frames in a video to an accurate geographic location, further limiting the usefulness of such a system. Examples of video based mobile image acquisition systems are disclosed in the following U.S. Pat. Nos. 5,633,946; 6,335,754; 6,363,161; 6,571,052, 6,741,790; and, 6,950,120. Video cameras acquire images continuously while in operation and no discrete photo request is needed to instruct the camera to acquire an image at a particular location.

In acquiring a large number of surface level digital images, it is desirable to use a moving vehicle equipped with a computer system including automated image collection software that relates the images to geographic position data; however, there are a number of difficulties encountered in creating and implementing such a system. Although the global positioning satellite (GPS) system offers geographic position data, the accuracy of the system is limited; this accuracy is reduced in a moving vehicle, since commercial GPS equipment reports position on an averaged basis and samples too infrequently to provide accurate position data while in motion. The low sampling rate also makes it difficult to predict the spacing (distance) between images as a function of time only, which introduces problems during post-processing. It is therefore desirable to enhance the GPS position data in order to obtain an accurate image location and spacing. Examples of systems for enhancing GPS location of moving vehicles, albeit not in connection with image acquisition, are provided in the following U.S. Pat. Nos. 6,061,627; and, 5,796,613.

In addition, it is desirable in such a system to use a commonly available digital camera to reduce system cost and to provide easy replacement in the event of camera malfunction. These cameras typically store the images within localized digital memory and do not commonly transmit the images to a computer in real-time; the transmission of images is made even more difficult when high resolution images are acquired, since the size of these images creates additional delay during transfer. The images stored locally on the camera cannot presently be tagged with the position data stored on the computer. A method of relating the separately stored image and position data is therefore needed. Examples of systems using still cameras are provided in the following U.S. Pat. Nos. 7,155,336; and, 6,233,523.

U.S. Pat. No. 7,155,336 discloses a system using synchronized time clocks on the camera and computer in order to later correlate the time-indexed images with time-indexed position information; however, synchronization between devices adds complexity to the system and can introduce image position errors if not maintained continuously. It is worthwhile noting that the use of synchronized clocks obviates the need for storing photo requests or responses on the computer for later use in correlating time valu'es between the camera and computer.

U.S. Pat. No. 6,233,523 relies on manual entry of house number information by an observer, either verbally or using a keyboard, to correlate images and position information; therefore, it is not necessary to store photo requests or responses for later linking of this information. When still image cameras are employed, it is described that the vehicle is stopped in front of each location where it is desired to acquire an image; images are therefore not acquired from a moving vehicle, which limits overall throughput.

Since a moving vehicle may not always travel in a straight path, the orientation of the camera can change, making it difficult to correct the image to a consistent perspective. It is therefore desirable to collect information on camera orientation and relate that information to the image being collected in order to simplify image perspective correction.

In order to overcome some or all of the above problems in the art, an improved method of acquiring geographically related digital images is needed.

SUMMARY OF THE INVENTION

According to an aspect of the present invention, there is provided a method of obtaining digital images related to geographic locations using a moving vehicle, the method comprising: providing a moving vehicle having thereon a computer interconnected with a GPS transceiver and a distance measurement means for providing a measurement of distance traveled by the vehicle, the computer operatively interconnected with a digital camera or cameras mounted on the vehicle; receiving into the computer a first geographic position from the GPS transceiver; receiving into the computer a measurement of distance traveled from the distance measurement means; determining when a pre-determined distance has been traveled by the vehicle based on the measurement of distance; generating a photo request for the digital camera at the pre-determined distance; taking a digital photo based on the photo request; repeating the previous four steps; receiving into the computer a second geographic position from the GPS transceiver; and, storing the photos, photo requests and/or responses, first and second geographic positions and distance measurements.

According to another aspect of the present invention, there is provided a system for obtaining digital images related to geographic locations comprising a vehicle having thereon a computer interconnected with a GPS transceiver and a distance measurement means for providing a measurement of distance traveled by the vehicle, the computer operatively interconnected with a digital camera mounted on the vehicle.

The vehicle may be a land vehicle. The distance measurement means may comprise a rotating wheel, for example a ground-engaging wheel or the like. The distance measurement means may function by providing a count of the number of rotations of the rotating wheel and, knowing the circumference of the wheel, thereby enable calculation of distance traveled by the wheel. The distance measurement means may provide a scalar and/or a vector measurement of distance. The distance measurement means may comprise a pair of laterally spaced apart independently rotating wheels, with the distance measurement means able to provide simultaneous measurements from each wheel; in this case, the difference in distance traveled by each wheel may be used to determine a change in vehicle orientation. The change in vehicle orientation may comprise the direction in which the vehicle has turned and the number of degrees in the turn and may be used to determine a distance vector for the vehicle.

To enhance the accuracy of the position of the photos and to obtain a camera orientation at the time the photo was taken, the change in vehicle orientation and the distance measurements may be used to iteratively fit a path traveled by the vehicle between the first and second geographic positions from the GPS transceiver. A plurality of GPS co-ordinate fixes may be used in obtaining the first and second geographic positions for use in this path fitting operation, which is preferably conducted during post-processing to reduce demand for on-board computational resources. The path may be comprised of a plurality of segments, each terminating with a vehicle location and orientation. These path segments may be associated with a time value obtained from the computer so that the location and orientation of the vehicle may be recreated at any historical point in time.

The camera may comprise a high-resolution digital still-image camera. The camera may have a resolution of at least 6 megapixels (MP), more preferably at least 8 MP, yet more preferably at least 10 MP. The camera may comprise at least two cameras oriented in opposite directions laterally of the vehicle. Each photo request may be directed to all cameras simultaneously. Each camera may use a normal rectilinear field of view or have a lens with a field of view with an angle of view suitable to capture the objects of interest on the camera's CCD given the available camera positions on the vehicle. Adjacent photos may comprise overlapping visual elements. The digital photos taken by the camera may be stored on the computer or on the camera itself. The digital photos may be stored in association with a camera time value.

The photo requests, camera responses to such requests, geographic positions and distance measurements may be stored on the computer and in association with a computer time value. A post-processing operation may be performed to associate or correlate each photo with the photo request used to generate that photo. An aspect of this operation may be to identify additional or missing photographs that do not correspond to a photo request (or vice versa). The post-processing operation may comprise identifying and comparing specific features and landmark within the time series of camera responses and EXIF times. This operation transforms the local camera time to the computer time via a piecewise affine transformation. A computer time value from the photo request or response may then be assigned to the photo. The computer time value assigned to the photo may additionally comprise a lag value to account for time differences between the generation of the photo request and the taking of the photo. The computer time value of the photo may be compared with a computer time value of a path segment to determine the position and orientation of the vehicle at the time the photo was taken.

The photos may be corrected to a rectilinear perspective based on at least the orientation of the vehicle at the time the photo was taken and the field of view of the lens. The geographic location of the photo may be determined using the first and second geographic positions and the vehicle location on the path. Either the uncorrected or the corrected photos may be stored in association with the geographic location of the photo, for example on a server accessible via the Internet.

The foregoing method is particularly suitable for use with an automobile. In one embodiment, the distance measurement means comprises wheel speed sensors connected to two opposite wheels of the automobile, for example two rear wheels. The automobile may be equipped with two laterally oriented cameras facing in opposite directions mounted to the roof of the vehicle using a removable roof rack system and operatively interconnected with a portable computer located within the vehicle using either a wireless or wired connection. The system is particularly well suited to taking photos at a variable rate of speed, preferably in the range of 25 km/h to 40 km/h and more preferably higher where local motor vehicle regulations permit.

The method of the present invention provides the following advantages. Commercially available components (e.g.: digital camera, automobile, wheel speed sensors, etc.) are utilized, which reduces cost and does not require a dedicated vehicle to be used. A rental vehicle may be non-permanently modified quickly and inexpensively and may be readily repaired by replacement of defective components. This permits short duration data acquisition activities to take place in a particular geographic location with any number of rented vehicles. The equipment and method are easy to setup and operate, which allows relatively unskilled operators to be employed. A geographic location can be assigned to each photo with enhanced position accuracy as compared with GPS alone. Consistent spacing between images is obtained by measuring distance directly using the distance measurement means. Camera orientation information is obtained for use in correcting the perspective of the images. This information may be associated with the photos, even if the photos are stored separately from the computer. Images may be acquired at relatively high speed, thereby reducing the time required to build a database of geographic images. These advantages impart significant commercial value to the method.

BRIEF DESCRIPTION OF THE DRAWINGS

Having summarized the invention, preferred embodiments thereof will now be described with reference to the accompanying figures, in which.

DETAILED DESCRIPTION

Figure 1A:
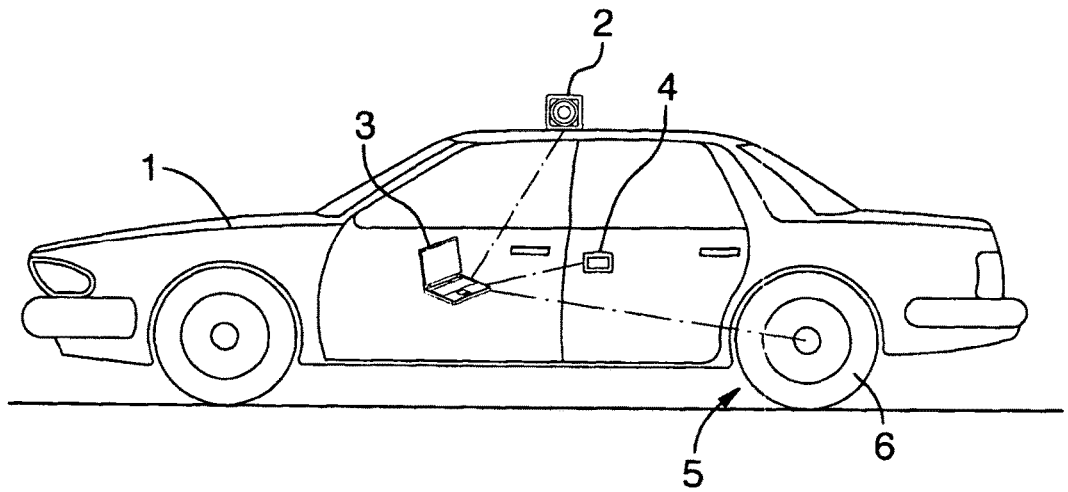
FIG. 1a schematically shows a vehicle including a computer connected to a roof-mounted camera, a GPS transceiver and a first embodiment of a distance measurement means.
Figure 1B:
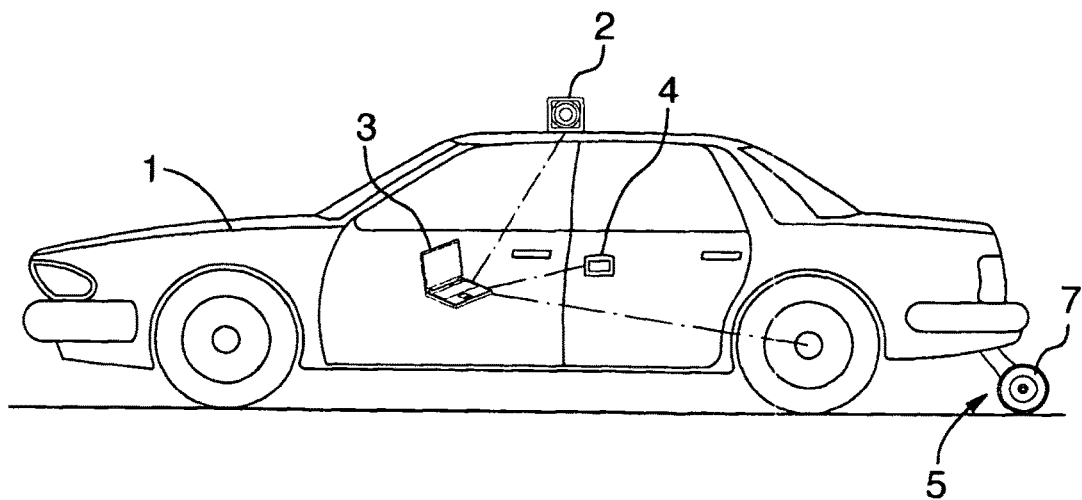
FIG. 1b schematically shows a vehicle including a computer connected to a roof-mounted camera, a GPS transceiver and a second embodiment of a distance measurement means.

Referring to FIGS. 1a and 1b, a vehicle 1 is shown comprising an automobile having removably mounted to its roof two oppositely oriented laterally facing cameras 2 (only one of which is shown), each equipped with a lens having a field of view of at least 160°, preferably a wide-angle (fish-eye) lens having a field of view of greater than 180°. The cameras are operatively interconnected with a computer 3, for example a notebook computer located inside the vehicle 1, via a control box (not shown) able to convert signals sent over a USB connection to conventional shutter release commands receivable by the cameras 2. Each camera is a digital still-image camera having a resolution of at least 6 megapixels (MP), preferably at least 8 MP, and stores the photos or images that it takes within electronic memory, for example within an on-board electronic memory card such as a Compact Flash™ (CF), Secure Digital™ (SD) or other suitable memory card. Since the rate of digital photo acquisition can be in the range of 2-5 images's, the camera and electronic memory are able to handle at least this rate of data transfer for images of size 1 megabyte (MB) and greater. It is noted that many modern digital still-image cameras can acquire video and digital video cameras can acquire still images; however, any camera which is used for (or intended for use in) acquiring still (non-video) images is considered to be a still-image camera within the meaning of the present invention, regardless of its ability to perform other functions. Non-limiting examples of suitable cameras 2 include the Canon EOS 20D™, EOS 30D™, Nikon D300™, etc. Use of commercially available and readily removable cameras is preferred, as it allows for ease of replacement and repair to minimize down time and cost in the event of a camera malfunction. The computer 3 is also interconnected with a GPS transceiver 4. The GPS transceiver 4 is preferably located within the computer 3, but may alternatively be present in a separate device, for example a portable GPS device or an on-board vehicle navigation system. The GPS transceiver 4 may rely on an internal or externally mounted antenna, depending in part on the available strength of GPS signals. The GPS transceiver 4 provides first and second geographic position information to the computer 3 that may be interpreted as latitude and longitude co-ordinates mapped to the WGS-84 geoid. These co-ordinates typically provide a position accuracy of about 10 m and are delivered at intervals of a few seconds. However, for certain applications, it is desirable to acquire images at precise intervals of less than 10 m, which translates to an acquisition rate of greater than one image per second. In this case, it is not possible to generate accurate photo location data relying on GPS alone.

A means for measuring distance 5 is interconnected with the computer 3 for use in refining the location of each photo and the interval between photos. The distance measurement means 5 preferably comprises a rotating wheel and more preferably comprises a pair of laterally spaced apart independently rotating wheels each able to deliver its own distance measurement. In FIG. 1a, the distance measurement means 5 comprises a wheel speed sensor (not shown) connected to each of the vehicle's rear wheels 6. These wheel speed sensors are often provided by the manufacturer as part of a vehicle's anti-lock braking system and/or traction control system; however, if a suitable wheel speed sensor is not available, an aftermarket wheel speed sensor can be installed. A wheel speed sensor typically provides a count of the number of rotations of the wheel to which it is connected. If the circumference of the wheel is known, then the distance traveled by the wheel may be determined based on the number of rotations. FIG. 1b shows an alternative embodiment of a distance measurement means 5 comprising a pair of laterally spaced apart independently rotating wheels 7, each equipped with a wheel speed sensor (not shown), mounted to the rear of the vehicle 1 using a conventional trailer hitch receiver (not shown). This embodiment of the distance measurement means 5 is particularly useful in situations where a vehicle equipped with anti-lock brakes or traction control is unavailable or where it is not possible to obtain data from existing wheel speed sensors.

Figure 2:
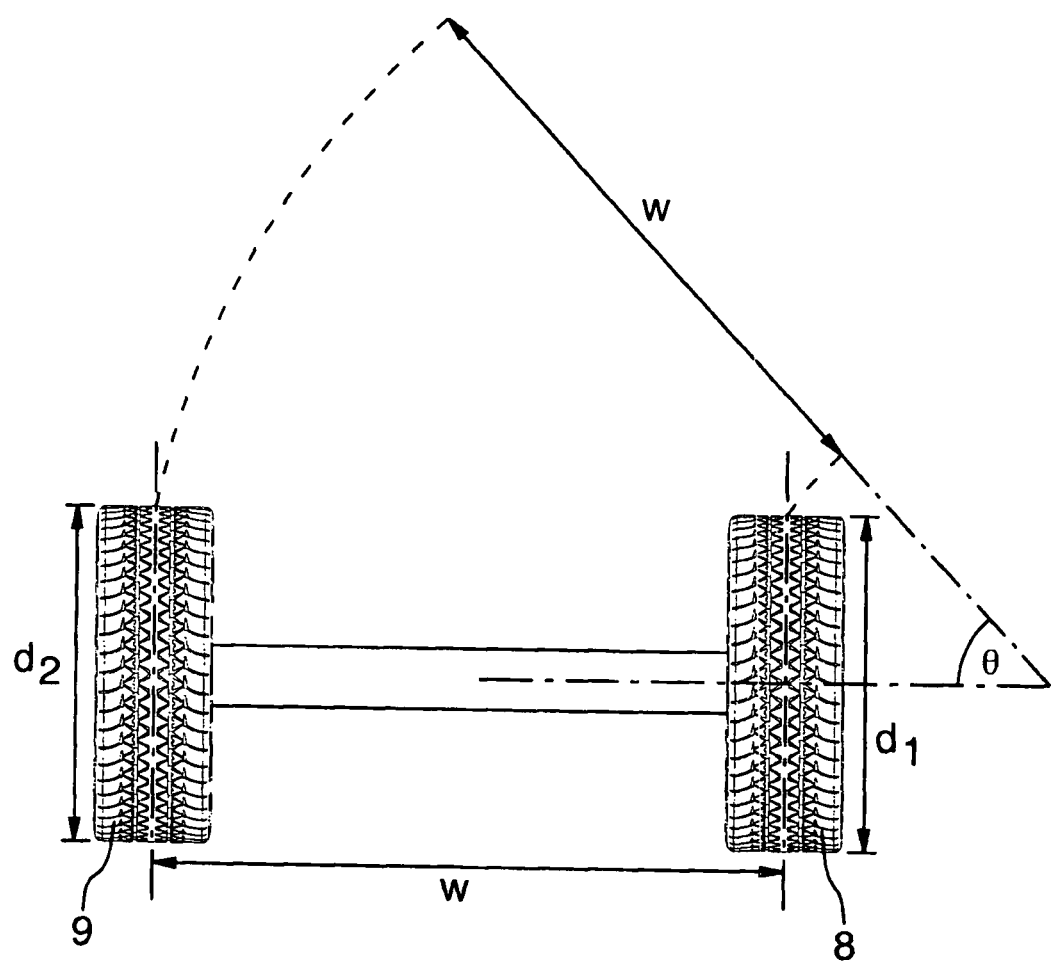
FIG. 2 schematically shows a distance measurement means useful in calculating a change in vehicle orientation.

Referring to FIG. 2, a distance measurement means 5 comprising two independently rotating laterally spaced apart wheels is shown in greater detail. The problem is cast as a error minimization in a multi-variate space. There are a number of unknown parameters that, when properly adjusted, will yield minimal error for a solution. In the preferred implementation, this is a six dimensional space. The space is not quadratic and therefore local minima in the error surface are known to exist. When the solver finds such a local minimum, either the operator must adjust the weights and or positions of the landmarks and resolve or utilize other means to correct the data. The six free parameters in the solver, solved on a local region of approximately 100 photos, are the ratio of right wheel and left wheel diameters; the number of sensor pulses per meter; the effective track width of the vehicle; and the three components of the initial position of the data series in the Cartesian space along with initial heading. The first wheel 8 has a diameter $d_1$ and the second wheel 9 has a diameter $d_2$. The circumference of each of the wheels 8, 9 can be calculated using the diameters $d_1$, $d_2$, respectively. The centerlines of the wheels 8, 9 are spaced apart by a distance w. Each of the wheels 8, 9 is equipped with a wheel speed sensor that delivers a count of the number of rotations of each wheel. When the vehicle orientation changes, for example when turning a corner or navigating around an obstacle, one of the wheels 8, 9 rotates more often over a particular time interval (faster) than the other wheel. In the embodiment shown, the wheel 9 rotates more often than the wheel 8 when making the depicted turn. Since the distance between the wheels w is fixed, the difference in the distance traveled by each wheel may be used to calculate a change in vehicle orientation θ, relative to the vehicle's initial orientation. By incorporating a suitable error minimization algorithm, such as Levinburg-Marquardt, it is possible to combine variable quality GPS data with higher quality local wheel sensor data to interpolate the position of the vehicle. This interpolation is further refined by employing a physical of the vehicle and restricting free parameters within strict ranges in absolute value and in their rate of change over time.

Figure 3:
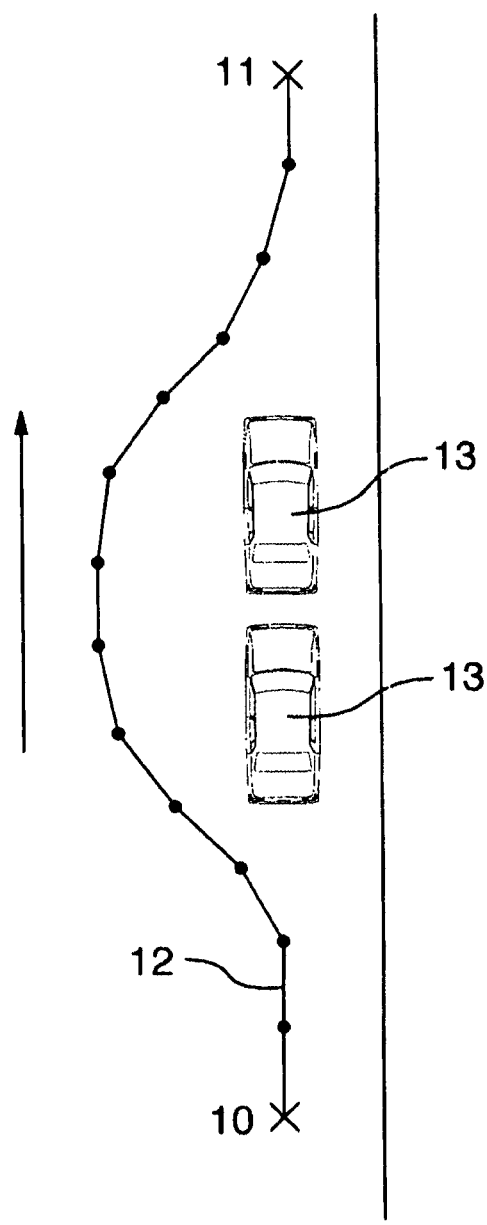
FIG. 3 illustrates a path traveled by a vehicle while navigating around an obstacle comprising a plurality of path segments; and, FIG. 4 shows the number of photos taken per unit of camera time plotted with the number of photo requests generated per unit of computer time.

Referring to FIG. 3, a path traveled between the first 10 and second 11 geographic positions may be determined using the measurement of distance traveled obtained from the distance measurement means 5. The path comprises a plurality of path segments 12, each of fixed distance and comprising an associated vehicle orientation. The distance or length of each path segment is selected based on the images being acquired, particularly the distance between the subject of the image and the camera. For urban settings where it is desirable to acquire street-level images of real estate in association with its geographic location, one convenient length is about 4.6 m (15 ft). Once it is determined by the computer 3 that this pre-determined distance has been traveled from the location of the first geographic position 10 (based upon measurements obtained from the distance measurement means 5), a photo request is generated by the computer. The photo request is transmitted over the USB connection to the cameras 2 via the control box and a photo is taken by each camera and electronically stored. In this way, the spacing between photos is kept constant, irrespective of the speed of the vehicle, which simplifies post-processing of the photos. In addition, when the vehicle is stopped, no images are acquired, which leads to memory savings as compared with a continuous-shooting (e.g. movie) camera. The determination of pre-determined distance traveled, generation of photo request and photo-taking steps are repeated for each path segment until the second geographic position 11 is reached. The second geographic position 11 then becomes the first geographic position for the next subsequent series of path segments and the process is repeated. The photo requests, distance measurements from each wheel and geographic position information are successively stored in an electronic database, indexed by the time at which they were generated.

In calculating the path traveled by the vehicle 1, the distance measurements are used to calculate a change in vehicle orientation associated with each path segment, as previously described. The last known vehicle orientation associated with the first geographic position 10 is used as a starting point for determining the effect of changes in vehicle orientation on the overall path of the vehicle. In this way, a path that comprises a significant course deviation caused by, for example, the need to navigate around an obstacle, such as the parked cars 13, can be accurately determined. Since there is a certain amount of uncertainty associated with the first and second geographic positions 10, 11, the path is iteratively fitted between the two endpoints until the most accurate co-ordinate fix for the endpoints is obtained; as a result, the accuracy of the first and second positions is enhanced by the fitting process. The use of two geographic positions to anchor the endpoints of the path also limits the cumulative effect of any error in the distance measurements obtained from the distance measurement means 5. This enhances the accuracy of path fitting between the two relatively closely spaced endpoints. The geographic position and orientation of the vehicle 1 at any particular point in time can therefore be accurately reconstructed through this path-fitting process.

Since the distance measurements and geographic positions are stored in a database by the computer 3, the time basis associated with the reconstructed path is the computer's system time. Since the computer 3 is able to periodically update its system time using the GPS transceiver (which receives highly accurate time measurements from the GPS satellite system), the system time is quite accurate. However, the photos themselves are typically electronically stored in association with a time value obtained from the camera 2, which may have a time basis that differs from that of the computer 3. The time bases of the computer 3 and camera 2 may differ in their absolute value (clock setting) or in their time interval. For example, at 35 km/h a tenth of a second difference in time basis translates to 1 m of position inaccuracy; this effect is cumulative for each path segment and can lead to substantial errors along the entire path. It is therefore important to correlate the camera time basis with the computer time basis in order to obtain accurate photo location data.

Figure 4:
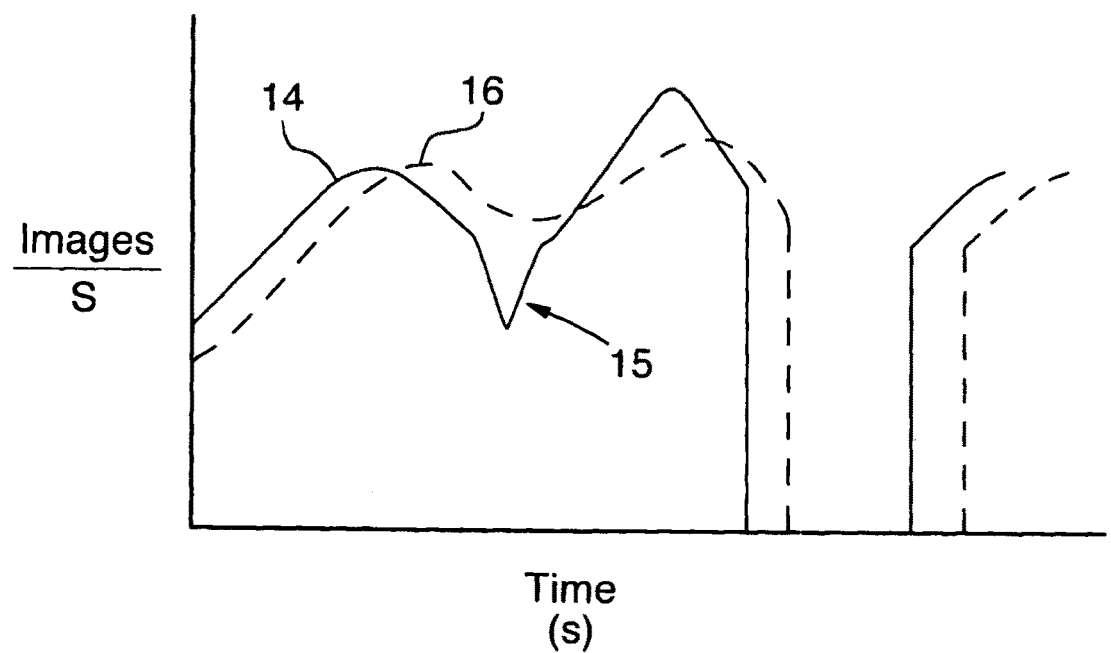

One means of correlating the camera and computer time bases is provided by matching a digital landmark obtained from the camera with a similar landmark obtained from the computer. The time series data taken from the image EXIF time and the local computer time are discretized after a power-law transformation to compress temporally distant quantities (which tend to drift) and reduce the impact of relatively small errors in larger quantities. To illustrate, referring additionally to FIG. 4, plotting the number of images per second acquired by the camera versus time (denoted on the figure as 14) provides a fingerprint that varies in height as the vehicle speed changes. The plot includes intervals having zero height when the vehicle is stopped and may include abrupt V-shaped formations (denoted generally on the figure as 15) if the camera misses a particular photo due to malfunction, buffer saturation, etc. Note that, at speeds of from 1 to 65 km/h and pre-determined distance intervals of about 4.6 m, the number of images per second varies between about 2 and 5. Plotting the number of photo requests per second generated by the computer on the same axes results in a plot (denoted as 16) having a similar overall appearance; however, the plot 14 will generally lag the plot 16, due to elapsed time between generation of the photo request and the actual taking of the photo, and could be stretched if a slight difference in time interval exists between the camera 2 and the computer 3. This lag and/or difference can be quantified by comparing camera time values of a plurality of photos with computer time values of a plurality of photo requests. The time series data is then compiled into a vector representation of the time series by slicing the time series into a number of grouped photographs separated by suitably long-duration periods in which photos were not taken. These are compared and a set of affine transformation coefficients are recovered over non-overlapping windows of data which then collectively provide a piecewise linear transformation from camera to computer time.

Once the time basis of the photos is corrected, each photo can then be resolved to the specific photo request used to generate that photo. This is generally accomplished by matching the computer time value of the photo with the computer time value of the closest photo request; however, over a prolonged period of data acquisition, it can become difficult to match the two accurately if significant correction to the camera time basis was necessary. Inconsistencies in the plot 14 caused by missed images (V-shaped formations 15) and zero or low value intervals where the vehicle is stopped or turning a corner, can be used to re-initialize the comparison process, since the photo and photo request immediately following these inconsistencies can be readily identified and matched with one another. This improves the overall accuracy of matching between photos and photo requests. Once the matching process is complete, the computer time value obtained from the photo request can be associated with its respective photo. A lag value can be optionally re-introduced, thereby resulting in a highly accurate computer time value relating to when the photo was actually taken.

Since the path is comprised of a plurality of segments that terminate with a vehicle location and orientation at a particular computer time value, the accurate computer time value of the photo can be used to retrieve location and orientation information for the photo from the path. Due to the fish-eye lens used to obtain a wide angle field of view, straight lines in an image appear curved when viewed in two dimensional space. In order to correct the images to a rectilinear perspective, both the field of view of the lens and the orientation of the camera at the time the image was taken are used to provide a centered perpendicular or "head-on" image orientation. In this way, successive streetscape images acquired by the vehicle all have the same perspective, even if the vehicle had to change orientation significantly to circumvent an obstacle, such as the parked cars 13. This provides consistency when adjacent images are viewed in succession and even allows successive images to be stitched together if so desired. To aid in this stitching and to provide image overlap should one or more of the images be lost due to camera malfunction, buffer saturation, etc., it is desirable that adjacent images contain overlapping visual elements. This is accomplished through use of a lens having a field of view greater than 180 degrees and by selection of an appropriate pre-determined distance between images.

By taking photos using two oppositely oriented laterally facing cameras, a single photo request may be used to generate images along both sides of a route being traveled. This allows a particular route to be traveled only once for a series of photos along both sides of the route. Since the cameras are essentially perpendicular to the route being traveled, knowledge of the vehicle orientation at any point along the path allows the orientation of both cameras to be determined for use in perspective correction as previously described.

A system according to the present invention includes the elements as described with reference to FIGS. 1a and 1b, namely a vehicle 1 having thereon a computer 3 interconnected with a GPS transceiver 4, a distance measurement means 5 for providing a measurement of distance traveled by the vehicle and operatively interconnected with a digital camera 2 mounted on the vehicle. In a preferred embodiment, the vehicle is an automobile and has two laterally oriented cameras facing in opposite directions mounted thereto, preferably on the roof thereof to raise the height of the cameras above street-level obstacles. The computer 3 preferably comprises a notebook computer operatively interconnected with the cameras 2 using a USB connection via a control box able to generate shutter release commands. The distance measurement means 5 preferably comprises a pair of laterally spaced apart independently rotating wheels, each equipped with a wheel speed sensor for simultaneously generating a measurement of distance traveled by each wheel. In one embodiment, the distance measurement means 5 utilizes on-board wheel speed sensors associated with each of the rear wheels 6 of the vehicle 1. In another embodiment, the distance measurement means 5 utilizes a separate pair of laterally spaced apart independently rotating wheels 7 mounted to the rear of the vehicle using a conventional hitch receiver.

The foregoing describes preferred embodiments of the invention in a non-limiting sense and other features and embodiments of the invention will be evident to persons skilled in the art. The following claims are to be construed broadly with reference to the specification and are intended by the inventor to include other variations and sub-combinations, even if not explicitly claimed.

The invention claimed is:

1. A method of obtaining digital images related to geographic locations, the method comprising:
   providing a moving vehicle having thereon a computer having a computer clock interconnected with a GPS transceiver and distance measurement structure configured to measure a distance traveled by the vehicle, the distance measurement structure comprising a pair of laterally spaced apart independently rotating wheels, the wheels spaced apart by a track width, the distance measurement structure simultaneously providing wheel speed measurements from each wheel, the wheel speed measurements and a diameter of each wheel being used to calculate a distance traveled by each wheel, the computer operatively interconnected with a digital camera having a camera clock mounted on the vehicle;
   receiving into the computer a first geographic position from the GPS transceiver;
   receiving into the computer a measurement of distance traveled by the vehicle relative to the first geographic position from the distance measurement structure;
   selecting a pre-determined distance based on a distance between a subject of a photo to be acquired and the camera;
   determining when the pre-determined distance has been traveled by the vehicle based on the measurement of distance;
   generating a photo request using the computer on the vehicle for the digital camera on the vehicle at the pre-determined distance, the photo request having an associated photo request time comprising a computer time value obtained from the computer clock, the photo request resulting in a shutter release by the digital camera;
   taking a digital photo using the camera on the vehicle based on the shutter release, the digital photo having an associated photo time comprising a camera time value obtained from the camera clock;
   repeating the steps of receiving into the computer the measurement of distance traveled by the vehicle, determining when the pre-determined distance has been traveled, generating a photo request using the computer resulting in a shutter release by the digital camera and taking a digital photo using the camera on the vehicle based on the shutter release;
   receiving into the computer a second geographic position from the GPS transceiver;
   storing the photos, associated photo times, photo requests, associated photo request times, first and second geographic positions and distance measurements;
   conducting a post-processing step remotely from the vehicle, the post-processing step comprising
      calculating a difference in the distance measurements from the two wheels;

calculating a change in vehicle orientation based on the difference;

using the change in orientation and distance traveled, iteratively fitting a plurality of path segments, each having a fixed length corresponding to the pre-determined distance and having an associated vehicle orientation comprising the direction in which the vehicle has turned and the number of degrees in the turn, to a path traveled by the vehicle between the first and second geographic positions, the path iteratively fit in three dimensional Cartesian space by an error minimization solver using at least i) the diameter of each wheel or the ratio of the diameters of the two wheels, ii) the wheel speed of each wheel, iii) the track width, iv) the three components of an initial position in the Cartesian space corresponding to the first geographic position, and v) an initial heading of the vehicle;

associating each photo with the photo request used to generate that photo by comparing camera time values of a plurality of photos with computer time values of a plurality of photo requests using a piecewise affine transformation;

determining a computer time value associated with each photo based on the computer time value of the photo request plus a lag value that accounts for time differences between the generation of the photo request and the taking of the photo, the lag value quantified by comparing camera time values of a plurality of photos with computer time values of a plurality of photo requests;

obtaining a location of each photo on the path based on the computer time value of the photo; and, correcting each photo to a rectilinear perspective based on the associated vehicle orientation of the path segment corresponding to the photo and a field of view of the lens to provide a centered perpendicular image orientation for the photo.

2. The method of claim 1, wherein the vehicle is land-based.

3. The method of claim 1, wherein the vehicle comprises an automobile and wherein the distance measurement structure comprises a wheel speed sensor connected to each of the automobile's rear wheels.

4. The method of claim 1, wherein the digital camera is a still-image camera with a resolution of at least 6 megapixels.

5. The method of claim 1, wherein the digital camera is equipped with a lens having a field of view of at least 160°.

6. The method of claim 1, wherein the digital photos are adjacent to one another and share overlapping visual elements.

7. The method of claim 1, wherein the vehicle travels at a speed of at least 35 km/h while photos are being taken.

8. The method of claim 1, wherein the vehicle is equipped with at least two digital cameras oriented in opposite directions to one another and wherein each photo request is directed to all cameras.

9. The method of claim 1, wherein the error minimization solver comprises a Levinburg-Marquardt algorithm.

10. A method of obtaining digital images related to geographic locations, the method comprising:

providing a moving vehicle having thereon a computer having a computer clock interconnected with a GPS transceiver and distance measurement structure configured to measure a distance traveled by the vehicle, the distance measurement structure comprising a pair of laterally spaced apart independently rotating wheels, the wheels spaced apart by a track width, the distance measurement structure simultaneously providing wheel speed measurements from each wheel, the wheel speed measurements and a diameter of each wheel being used to calculate a distance traveled by each wheel, the computer operatively interconnected with a digital camera having a camera clock mounted on the vehicle;

receiving into the computer a first geographic position from the GPS transceiver;

receiving into the computer a measurement of distance traveled by the vehicle relative to the first geographic position from the distance measurement structure;

determining when a pre-determined distance has been traveled by the vehicle based on the measurement of distance;

generating a photo request using the computer on the vehicle for the digital camera on the vehicle at the pre-determined distance, the photo request having an associated photo request time comprising a computer time value obtained from the computer clock, the photo request resulting in a shutter release by the digital camera;

taking a digital photo using the camera on the vehicle based on the shutter release, the digital photo having an associated photo time comprising a camera time value obtained from the camera clock;

repeating the steps of receiving into the computer the measurement of distance traveled by the vehicle, determining when the pre-determined distance has been traveled, generating a photo request using the computer resulting in a shutter release by the digital camera and taking a digital photo using the camera on the vehicle based on the shutter release;

receiving into the computer a second geographic position from the GPS transceiver;

storing the photos, associated photo times, photo requests, associated photo request times, first and second geographic positions and distance measurements;

conducting a post-processing step remotely from the vehicle, the post-processing step comprising calculating a change in vehicle orientation;

using the change in orientation and distance traveled, iteratively fitting a plurality of path segments, each having a fixed length corresponding to the pre-determined distance and having an associated vehicle orientation comprising the direction in which the vehicle has turned and the number of degrees in the turn, to a path traveled by the vehicle between the first and second geographic positions;

associating each photo with the photo request used to generate that photo by comparing camera time values of a plurality of photos with computer time values of a plurality of photo requests;

determining a computer time value associated with each photo based on the computer time value of the photo request plus a lag value that accounts for time differences between the generation of the photo request and the taking of the photo;

obtaining a location of each photo on the path based on the computer time value of the photo; and, correcting each photo to a rectilinear perspective.

11. The method of claim 10, wherein the pre-determined distance is determined based on a distance between a subject of a photo to be acquired and the camera.

12. The method of claim 10, wherein the path is iteratively fit in three-dimensional Cartesian space by an error minimization solver using at least i) the diameter of each wheel or the ratio of the diameters of the two wheels, ii) the wheel speed of each wheel, iii) the track width, iv) the three components of an initial position in the Cartesian space corresponding to the first geographic position, and v) an initial heading of the vehicle.

13. The method of claim 10, wherein associating each photo with the photo request used to generate that photo by comparing camera time values of a plurality of photos with computer time values of a plurality of photo requests comprises using a piecewise affine transformation.

14. The method of claim 10, wherein the lag value is quantified by comparing camera time values of a plurality of photos with computer time values of a plurality of photo requests.

15. The method of claim 10, wherein each photo is corrected to a rectilinear perspective based on the associated vehicle orientation of the path segment corresponding to the photo and a field of view of the lens to provide a centered perpendicular image orientation for the photo.

16. A method of obtaining digital images related to geographic locations, the method comprising:
providing a moving vehicle having thereon a computer having a computer clock interconnected with a GPS transceiver and distance measurement structure configured to measure a distance traveled by the vehicle, the distance measurement structure comprising a pair of laterally spaced apart independently rotating wheels, the computer operatively interconnected with a digital camera having a camera clock mounted on the vehicle;
receiving into the computer a first geographic position from the GPS transceiver;
receiving into the computer a measurement of distance traveled by the vehicle relative to the first geographic position from the distance measurement structure;
determining when a pre-determined distance has been traveled by the vehicle based on the measurement of distance;
generating a photo request using the computer on the vehicle for the digital camera on the vehicle at the pre-determined distance, the photo request having an associated photo request time comprising a computer time value obtained from the computer clock, the photo request resulting in a shutter release by the digital camera;
taking a digital photo using the camera on the vehicle based on the shutter release, the digital photo having an associated photo time comprising a camera time value obtained from the camera clock;
repeating the steps of receiving into the computer the measurement of distance traveled by the vehicle, determining when the pre-determined distance has been traveled, generating a photo request using the computer resulting in a shutter release by the digital camera and taking a digital photo using the camera on the vehicle based on the shutter release;
receiving into the computer a second geographic position from the GPS transceiver;
storing the photos, associated photo times, photo requests, associated photo request times, first and second geographic positions and distance measurements; and,
conducting a post-processing step remotely from the vehicle.

17. The method of claim 16, wherein the post-processing step comprises calculating a change in vehicle orientation and, using the change in orientation and distance traveled, iteratively fitting a plurality of path segments, each having a fixed length corresponding to the pre-determined distance and having an associated vehicle orientation comprising the direction in which the vehicle has turned and the number of degrees in the turn, to a path traveled by the vehicle between the first and second geographic positions.

18. The method of claim 17, wherein the post-processing step further comprises associating each photo with the photo request used to generate that photo by comparing camera time values of a plurality of photos with computer time values of a plurality of photo requests.

19. The method of claim 18, wherein the post-processing step further comprises determining a computer time value associated with each photo based on the computer time value of the photo request plus a lag value that accounts for time differences between the generation of the photo request and the taking of the photo.

20. The method of claim 19, wherein the post-processing step further comprises obtaining a location of each photo on the path based on the computer time value of the photo.

21. The method of claim 20, wherein the post-processing step further comprises correcting each photo to a rectilinear perspective.

* * * * *